(12) United States Patent
Orosz et al.

(10) Patent No.: US 8,277,626 B2
(45) Date of Patent: Oct. 2, 2012

(54) METHOD FOR DEPOSITING AN ELECTRODEPOSITABLE COATING COMPOSITION ONTO A SUBSTRATE USING A PLURALITY OF LIQUID STREAMS

(75) Inventors: Gary Orosz, Valencia, PA (US); Donald W. Boyd, Cheswick, PA (US); Benjamin Kabagambe, Allison Park, PA (US); James W. McCamy, Export, PA (US); Douglas A. McPheron, Seven Fields, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 309 days.

(21) Appl. No.: 12/813,537

(22) Filed: Jun. 11, 2010

(65) Prior Publication Data
US 2011/0305906 A1    Dec. 15, 2011

(51) Int. Cl.
*C25D 13/00*    (2006.01)
(52) U.S. Cl. ........ 204/511; 204/490; 204/491; 204/492; 204/493; 204/499; 204/500; 204/509
(58) Field of Classification Search ................ 204/490, 204/491, 492, 493, 499, 500, 509, 511
See application file for complete search history.

(56) References Cited

U.S. PATENT DOCUMENTS

| | | | |
|---|---|---|---|
| 3,962,060 A | 6/1976 | Brasko et al. | |
| 4,050,997 A | 9/1977 | Heissler | |
| 5,264,096 A | 11/1993 | Jorgens | |
| 5,480,528 A | 1/1996 | Bischoping et al. | |
| 7,229,541 B2 * | 6/2007 | Hara et al. | 204/471 |
| 2004/0026247 A1 * | 2/2004 | Kniazev et al. | 204/471 |
| 2008/0023332 A1 * | 1/2008 | Webber et al. | 204/510 |
| 2008/0273061 A1 * | 11/2008 | Tsuchiya et al. | 347/55 |
| 2009/0084682 A1 * | 4/2009 | McMillen et al. | 205/50 |
| 2010/0048814 A1 * | 2/2010 | Polk | 524/850 |
| 2010/0159258 A1 * | 6/2010 | Rakiewicz et al. | 428/457 |
| 2010/0285334 A1 * | 11/2010 | Lingenfelter et al. | 428/660 |
| 2012/0097546 A1 * | 4/2012 | Kabagambe et al. | 205/116 |

* cited by examiner

*Primary Examiner* — Bruce Bell
(74) *Attorney, Agent, or Firm* — Steven Hays

(57) ABSTRACT

The present invention is directed to a method for coating a substrate wherein the substrate is electrically conductive, the method comprising simultaneously applying a plurality of electrically conductive liquid materials to different portions of the substrate wherein at least one of the electrically conductive liquid materials comprises an ionic compound; and applying an electrical current to at least one of the liquid materials thereby depositing the ionic compound onto the substrate.

20 Claims, No Drawings

METHOD FOR DEPOSITING AN ELECTRODEPOSITABLE COATING COMPOSITION ONTO A SUBSTRATE USING A PLURALITY OF LIQUID STREAMS

BACKGROUND OF THE INVENTION

1. Field of the Invention

The present invention relates generally to a method of depositing an electrodepositable coating composition onto at least a portion of a substrate through the use of a plurality of liquid streams.

2. Background Information

Utilization of a flow coating process to deposit an electrodepositable coating composition onto a substrate is well known in the art. In these processes, an electrodepositable coating composition, which is also referred to as an e-coat or electrodeposition coating, is deposited onto a conductive substrate via an electrical process.

In general, the flow coating process can be seen as an electrical circuit when an electrical current is applied to the system. In this electrical circuit, the electrodepositable coating composition has a cationic or anionic charge while the surface of the substrate, which is to be coated, has a charge that is opposite to that of the electrodepositable coating composition (i.e., the surface may be anionic or cationic). During the coating process, a complete electrical circuit is created by a direct current rectifier thereby allowing the coating composition to deposit onto the oppositely charged surface of the substrate. However, in order to complete the electrical circuit, the conductive substrate is grounded or bonded to the rectifier through the use of a mechanical contact, such as a clip, which contacts or is connected to the substrate.

One shortcoming of using this mechanical contact, however, is that the point or area of contact ("contact point") will not be coated with the electrodepositable coating composition since it is covered by the mechanical contact and, therefore, the electrodepositable coating composition is not applied to that area. Since the contact point is not coated with the electrodepositable coating composition, it not only detracts from the visual appearance of the substrate (i.e., the substrate is not uniformly coated with the coating composition), but the contact point can also be more susceptible to corrosion when compared to an area that has been coated with the electrodepositable coating composition.

SUMMARY OF THE INVENTION

The present invention is directed to a method for coating a substrate wherein the substrate is substantially electrically conductive, the method comprising simultaneously applying a plurality of electrically conductive liquid materials to different portions of the substrate wherein at least one of the electrically conductive liquid materials comprises an ionic compound; and applying an electrical current to at least one of the liquid materials thereby depositing the ionic compound onto the substrate. The present invention is also directed to a substrate that is coated by this process.

The present invention is also directed to a method for coating a substrate wherein the substrate is electrically conductive, the method comprising: applying an electrodepositable coating composition comprising an ionic compound onto at least a portion of the substrate; and simultaneously applying another liquid material onto another portion of the substrate; wherein both the electrodepositable coating composition and the liquid material are electrically conductive; and wherein when an electrical current is applied to the electrodepositable coating composition or the electrically conductive liquid material, the electrical potential gradient between the electrodepositable coating composition and the electrically conductive liquid material is sufficient to allow the ionic compound to deposit onto the substrate.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10. As employed herein, the term "number" means one or an integer greater than one.

As used herein, plural phrases or terms encompasses their singular counterparts and vice versa, unless specifically stated otherwise. By way of illustration, and not limitation, although reference is made herein to "an" electrodepositable coating composition, and "a" liquid material, "an" ionic compound; a plurality of these materials may be used in the present invention. As used herein, "plurality" means two or more.

As used herein, "includes" and like terms means "including without limitation."

As used herein, the use of "or" means "and/or" unless specifically stated otherwise, even though "and/or" may be explicitly used in certain instances.

As used herein, "molecular weight" means weight average molecular weight (Mw) as determined by Gel Permeation Chromatography.

As used herein, the term "cure" refers to a process wherein the crosslinkable components of a coating are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

Reference to any monomer(s) herein refers generally to a monomer that can be polymerized with another polymerizable component such as another monomer or polymer. Unless otherwise indicated, it should be appreciated that once the monomer components react with one another to form a compound, the compound will comprise the residues of such monomer components.

The present invention is directed to a method for depositing an electrodepositable coating composition onto at least a portion of a substrate. Unlike substrates that have been coated by a conventional flow coating method, substrates that are coated using the method disclosed herein lack the contact points described above. That is, the substrates that are coated pursuant to the method disclosed herein are not grounded by a mechanical contact and, therefore, are substantially free of contact points.

In general, the method of the present invention comprises simultaneously applying a plurality of liquid materials onto different portions or areas of a conductive substrate. At least two of the liquid materials used are electrically conductive. Moreover, at least one of these electrically conductive liquid materials comprises an ionic compound that is to be deposited onto the substrate. When a complete electrical circuit is desired, each of the conductive liquid materials are applied to the substrate in the form of a continuous stream and an electrical circuit is applied to a conductive flow dispenser through which the liquid materials flow, such as a pipe or nozzle which is electrically connected or bonded to a direct current rectifier, thereby forming an electrical circuit. That is, the conductive liquid materials and the substrate form a complete circuit when an electrical potential is applied to the system. Once the electrical circuit is formed, the ionic compound is deposited onto the surface of the substrate via methods and/or chemical processes that are well known in the art of electrodeposition coatings. It is noted that the electrical potential gradient between the various conductive liquid materials used in the electrical circuit should be sufficient to deposit the ionic compound in the manner that is described in the preceding sentence.

In some embodiments, a first liquid stream, which can comprise an ionic compound that is to be deposited onto the substrate, is applied onto one area of the substrate while a second liquid stream is simultaneously applied onto a different area of the substrate. In order to form an electrical circuit, each of these streams would be electrically conductive. Moreover, so long as these streams are simultaneously and continuously applied to the substrate, an electrical charge may be applied to one of the streams thereby depositing the ionic compound onto the electrically conductive substrate as described above.

In other embodiments, however, the second liquid stream comprises the ionic compound that is to be deposited onto the substrate while the first liquid stream does not.

While the preceding paragraphs describe situations where a first and second liquid stream is used in the process, the present invention can also be used in manner where multiple sets of liquid streams are used. For example, the first and second liquid streams described above can be characterized as a set. Accordingly, in some embodiments of the present invention, multiple sets may be used. That is, in certain embodiments, the present invention can have a plurality of liquid streams that form a first set and a plurality of streams that form a second set. In these embodiments, the second set would be downstream from that of the first set. Accordingly, the first set can comprise the first and second liquid streams described in the preceding paragraph while the second set can comprise a third liquid stream as well as a fourth liquid stream. The third and fourth liquid streams would be similar to the first and second liquid streams in that they would be electrically conductive. Moreover, either the third and fourth liquid stream can comprise the ionic compound as described above. Depending on the user's needs and/or requirements, any number of sets may be used in the present invention.

While the present invention is generally described as applying a plurality of electrically conductive liquid materials simultaneously onto different portions of a conductive substrate, it is noted that a non-electrically conductive liquid material, such as deionized water, may also be applied onto the substrate simultaneously with the electrically conductive liquids. For instance, the non-electrically conductive liquid material can be applied onto the substrate at a location that is either upstream or downstream from the first and/or second liquid streams or it can be applied onto the substrate at a location that is in between the first and second liquid streams. The uses of the non-electrically conductive liquid material can vary, but deionized water, for example, can be used in order to wash at least a portion of the substrate prior to or after the first liquid stream. Since the non-electrically conductive liquid material cannot conduct an electrical charge, the electrical circuit still flows through the first liquid stream, the substrate, and the second liquid stream.

As stated above, one or more of the electrically conductive liquids described above can comprise an electrodepositable coating composition or electrocoat coating composition. Suitable electrodepositable coating compositions known in the art can be used in the present invention. In general, the electrodepositable coating composition comprises a film-forming polymer and a curing agent that is capable of reacting with the film-forming polymer. A wide variety of film-forming polymers can be used so long as the film-forming polymers are "water dispersible." As used herein, "water dispersible" means that a material is adapted to be solubilized, dispersed, and/or emulsified in water. Examples of film-forming polymers suitable for use in the present invention, without limitation, resins or polymers derived from a polyepoxide, an acrylic, a polyurethane, a polyester, or combinations thereof. In certain embodiments, the film-forming polymer can comprise functional groups. As used herein, "functional groups" or "reactive functional groups" mean hydroxyl, carboxyl, carbamate, epoxy, isocyanate, aceto acetate, amine-salt, mercaptan, or combinations thereof. The film-forming polymer described above is also ionic in nature. Specifically, the film-forming polymers can be cationic or anionic. Therefore, in some embodiments, the film-forming polymer can comprise cationic salt groups, generally prepared by neutralizing a functional group on the film-forming polymer with an acid, which enables the film-forming polymer to be electrodeposited onto a cathode. For example, in some embodiments, a film-forming cationic polymer can be derived by first reacting a polyepoxide containing polymer with an amine, such as those described above, 1,5,7-triazabicyclo[5.5.0]dec-5-ene (TBD), sulfides, or combinations thereof, then reacting the polymer with an acid. Depending on the compound that is used to react with the epoxy functional polymer, the acid can either be added to the polymer after the polymer has been reacted with the amine, TBD, and/or sulfide or it can be added to the polymer in combination with these compounds. In certain embodiments, the "ionic compound" means the ionic film-forming polymer described above.

The electrodepositable coating composition of the present invention can also comprise a curing agent or crosslinking agent that is reactive towards that film-forming polymer described in the preceding paragraph. For example, the curing agent may comprise moieties that are reactive with the functional groups of the film-forming polymer. Suitable crosslinking agents that may be used include, without limitation, aminoplasts, polyisocyanates (including blocked isocyanates), polyepoxides, beta-hydroxyalkylamides, polyacids, anhydrides, organometallic acid-functional materials, polyamines, polyamides, cyclic carbonates, siloxanes, or combinations thereof. In some embodiments, the curing agent can comprise from 30 weight % to 40 weight % based on the total resin solids of the electrodepositable coating composition.

In certain embodiments, the electrodepositable coating composition may further comprise a curing catalyst which may be used to catalyze the reaction between the crosslinking agent and the film-forming polymer. Suitable curing catalysts that may be used in the present invention include, without limitation, organotin compounds (e.g., dibutyltin oxide, dioctyltin oxide) and salts thereof (e.g., dibutyltin diacetate); other metal oxides (e.g., oxides of copper, manganese, cerium, zirconium and/or bismuth) and salts thereof (e.g., bismuth sulfamate and/or bismuth lactate), a cyclic guanidine (as described in paragraphs [0010] to [0015] of U.S. Pat. Pub. 2009/0042060, the cited portions being incorporated herein be reference), or combinations thereof.

As described above, the present invention comprises simultaneously applying a plurality of conductive liquid materials to different portions of the substrate. While one of the liquid materials (e.g., first liquid stream or second liquid stream) may comprise the electrodepositable coating composition described in the preceding paragraphs, the other liquid material (e.g. second liquid stream or first liquid stream) can comprise any liquid material so long as it is electrically conductive. For example, water (not deionized water) or permeate may be used as the other liquid material. One skilled in the art of electrodeposition will recognize what is meant by permeate. Therefore, a detailed description of that material will not be set forth herein. Permeate, however, may generally be described as the remnants of an electrodeposition bath after the bath has undergone ultrafiltration. Accordingly, permeate can comprise a small portion of the film-forming polymer described above.

In some embodiments, the first liquid stream comprises an electrodepositable coating composition while the second liquid stream comprises water or permeate. Alternatively, the first liquid stream can comprise water or permeate while the second liquid stream comprises the electrodepositable coating composition. In these embodiments, the first and second liquid streams can comprise ionic charges that are opposite to one another. For example, if the electrodepositable coating composition that is used for the first stream comprises a positive charge (i.e., the first stream is cathodic), then the water or permeate that is used for the second stream comprises a negative charge (i.e., the second stream is anodic). Alternatively, if the electrodepositable coating composition comprises a negative charge, then the water or permeate may comprise a positive charge.

The various liquid materials (e.g., electrodepositable coating composition, water, permeate) described above can be applied to the substrate using techniques that are known in the art. For example, the various liquid materials may be sprayed applied onto the substrate or the substrate can flow through a curtain of the liquid materials or stream of liquid materials. Accordingly, a spray nozzle, pipe nipple, or any other type of aperture (e.g., slit) can be used in the apparatus to apply the liquid materials onto the substrate. It should be noted that the process parameters for applying the various liquid materials onto the substrate will be dependent upon the user's needs and, therefore, different types and shapes of apertures and/or nozzles may be used to apply the liquid materials onto the substrate.

The thickness on which the electrodepositable coating composition is deposited onto the substrate will be dependent upon the user's needs as well as the shape of the substrate. In some embodiments, the wet and/or dry film thickness of the coating will range from 1 micron to 150 microns.

In some embodiments, means for curing the electrodepositable coating composition can be positioned in the process such that the electrodepositable coating composition is substantially or completely cured after the coating composition is deposited onto the substrate. For example, in certain embodiments, a UV lamp can be positioned between the first and second streams such that a UV curable electrodepositable coating composition that is being deposited onto the substrate from the first stream is substantially and/or completely cured prior to the coating reaching the second stream. In other embodiments, the UV lamp can be positioned after the station with the second stream thereby curing the electrodepositable coating composition after it has exited, for example, the permeate station. While the preceding sentence described a UV lamp as being used to cure the electrodepositable coating composition, other methods for curing the coating composition can be used depending on the particular chemistry of the electrodepositable coating composition. For instance, thermal heating/energy, infrared radiation, induction heating, electron beam radiation, and/or ionizing or actinic radiation may be used to cure the electrodepositable coating composition. In certain embodiments, the curing operation can be carried out at ambient temperatures. In other embodiments, the curing operation can be carried out at temperature $\leqq 260°$ C. In certain embodiments, the curing operation can carried out at temperatures ranging between any combination of values, which were recited in the preceding sentences, inclusive of the recited values. For example, the curing operation can be carried out at temperatures ranging from 120° C.-150° C. It should be noted, however, that lower or higher temperatures may be used as necessary to activate the curing mechanisms.

In other embodiments, an air knife may be positioned upstream, downstream, or between the first and/or second streams in order to substantially dry at least a portion of the substrate.

While any number of methods may be used to convey the substrate through the various liquid materials described above, it is noted that the actual apparatus used to convey the substrate does not ground the substrate nor is it electrically bonded or connected with the rectifier. In other words, any apparatus can be used to convey the substrate through the liquid materials so long as the portion of the apparatus that contacts the substrate is non-conductive nor grounded or electrically connected to an apparatus that is grounded. For example, in certain embodiments, the substrate can be placed on a plurality of rollers which would convey the substrate through the various liquid materials. These rollers can be made entirely of plastic or they can comprise a plastic shell that surrounds a metallic core. In this embodiment, the plastic shell is the portion of the roller that contacts the substrate. Additionally, the substrate can be conveyed through the liquid materials in a manner such that the portions of the substrate that are being coated with the liquid materials are not in contact with any other object and is thus suspended in air as they pass through the liquid materials. This might be accomplished by placing a roller that unwinds a coiled metal substrate, such as a metallic sheet (e.g., sheet stock), upstream from the first liquid stream while a roller that coils or winds the metallic sheet into a coil is placed downstream from the second liquid stream. In some embodiments, the process line is configured such that both sides of the metallic sheet are coated with an electrodepositable coating composition. This can be accomplished by positioning a first set of liquid streams adjacent to one surface of the metallic sheet while positioning a second set of liquid streams adjacent to opposite surface of the metallic sheet. In situations where a cylindrical shaped substrate is being coated with the electrodepositable coating composition, the user could use a means of conveyance such that the cylindrical substrate rotates as it passes through at least one set of liquid streams thereby coating the entire surface of the cylindrical substrate.

Suitable substrates that can be coated with the various liquid materials disclosed herein comprise metal substrates, glass substrates (including those that comprise an electrical conductive coating), metal alloy substrates, substrates that have been metallized, such as nickel plated plastic, and/or plastic substrates. In some embodiments, the metal or metal alloy can be aluminum and/or steel. For example, the steel substrate could be cold rolled steel, electrogalvanized steel, and/or hot dipped galvanized steel. Moreover, in some embodiments, the substrate may comprise a portion of a vehicle such as a vehicular body (e.g., without limitation, door, body panel, trunk deck lid, roof panel, hood, and/or roof) and/or a vehicular frame. As used herein, "vehicle" or variations thereof includes, but is not limited to, civilian, commercial, and military land vehicles such as cars, motorcycles, and trucks. In other embodiments, the metal substrate can comprise rod (e.g., solid rod), pipe, wire, and/or metallic sheet (e.g., perforated mesh or screen). It will also be understood that, in some embodiments, the substrate may be pretreated with a pretreatment solution, such as a zinc phosphate solution as described in U.S. Pat. Nos. 4,793,867 and 5,588,989 or not pretreated with a pretreatment solution.

While the electrodepositable coating composition described above need not be topcoated with additional coating compositions, in certain embodiments, the electrodepositable coating composition is used in a coating system. The coating system typically comprises a number of coating layers. A coating layer is typically formed when a coating composition that is deposited onto the substrate is substantially cured by methods known in the art (e.g., by thermal heating).

One example of a coating composition that can be applied over at least a portion of the electrodepositable coating layer is a primer-surfacer. Primer-surfacers are typically used to enhance chip resistance of subsequently applied coating layers (e.g., color imparting coating composition and/or substantially clear coating composition) as well as to aid in the appearance of the subsequently applied layers. As used herein, "primer-surfacer" refers to a primer composition for use under a subsequently applied coating composition, and includes such materials as thermoplastic and/or crosslinking (e.g., thermosetting) film-forming resins generally known in the art of organic coating compositions. Suitable primers and primer-surfacer coating compositions include spray applied primers, as are known to those skilled in the art. Examples of suitable primers include several available from PPG Industries, Inc., Pittsburgh, Pa., as DPX-1791, DPX-1804, DSPX-1537, GPXH-5379, OPP-2645, PCV-70118, and 1177-225A. Another suitable primer-surfacer coating composition that can be utilized in the present invention is the primer-surfacer described in U.S. patent application Ser. No. 11/773,482.

In some embodiments, a color imparting coating composition (hereinafter, "basecoat") is deposited onto at least a portion of the primer surfacer coating layer (if present). Any basecoat coating composition known in the art may be used in the present invention. It should be noted that these basecoat coating compositions typically comprise a colorant.

In certain embodiments, a substantially clear coating composition (hereinafter, "clearcoat") is deposited onto at least a portion of the basecoat coating layer. As used herein, a "substantially clear" coating layer is substantially transparent and not opaque. In certain embodiments, the substantially clear coating composition can comprise a colorant but not in an amount such as to render the clear coating composition opaque (not substantially transparent) after it has been cured. Any clearcoat coating composition known in the art may be used in the present invention. For example, the clearcoat coating composition that is described in U.S. Pat. Nos. 5,989, 642, 6,245,855, 6,387,519, and 7,005,472 can be used in the coating system. In certain embodiments, the substantially clear coating composition can also comprise a particle, such as a silica particle, that is dispersed in the clearcoat coating composition (such as at the surface of the clearcoat coating composition after curing). In some embodiments, the coating composition comprising the polymer described herein can be used as the clearcoat coating composition.

The basecoat and/or clearcoat described in the preceding paragraph can also comprise colorants and/or other optional materials, which are known in the art of formulated surface coatings. As used herein, the term "colorant" means any substance that imparts color and/or other opacity and/or other visual effect to the composition. The colorant can be added to the coating in any suitable form, such as discrete particles, dispersions, solutions and/or flakes (e.g., aluminum flakes). A single colorant or a mixture of two or more colorants can be used in the coating composition described herein.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which discreet "composite microparticles", which comprise a nanoparticle and a resin coating on the nanoparticle, is dispersed. Example dispersions of resin-coated nanoparticles and methods for making them are identified in United States Patent Application Publication 2005-0287348, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating composition described herein. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919, filed Jul. 16, 2004.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

One or more of the coating compositions described herein can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

In addition to the materials described above, one or more of the coating composition described above can also comprise an organic solvent. Suitable organic solvents that can be used in the coating composition include any of those listed in the preceding paragraphs as well as butyl acetate, xylene, methyl ethyl ketone, or combinations thereof.

It will be further appreciated that one or more of the coating compositions that form the various coating layers described herein can be either "one component" ("1K"), "two component" ("2K"), or even multi-component compositions. A 1K composition will be understood as referring to a composition wherein all of the coating components are maintained in the same container after manufacture, during storage, etc. A 2K composition or multi-component composition will be understood as referring to a composition wherein various components are maintained separately until just prior to application. A 1K or 2K coating composition can be applied to a substrate and cured by any conventional means, such as by heating, forced air, and the like.

The pretreatment solution, primer-surfacer, basecoat, and/or clearcoat can be deposited or applied onto the substrate using any technique that is known in the art. For example, the coating compositions can be applied to the substrate by any of a variety of methods including, without limitation, spraying, brushing, dipping, and/or roll coating, among other methods. When a plurality of coating compositions are applied onto a substrate, it should be noted that one coating composition may be applied onto at least a portion of an underlying coating composition either after the underlying coating composition has been cured or prior to the underlying coating composition being cured. If the coating composition is applied onto an underlying coating composition that has not been cured, both coating compositions may be cured simultaneously.

The primer-surfacer, basecoat, and/or clearcoat can be cured using the methods described above. However, in certain embodiments, one or more of these coating compositions can be a low temperature, moisture curable coating compositions. As used herein, the term "low temperature, moisture curable" refers to coating compositions that, following application to a substrate, are capable of curing in the presence of ambient air, the air having a relative humidity of 10% to 100%, such as 25% to 80%, and a temperature in the range of −10° C. to 120° C., such as 5° C. to 80° C., in some cases 10° C. to 60° C. and, in yet other cases, 15° C. to 40° C.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

The following examples show various non-limiting embodiments of the present invention.

Example 1

A 40 cm long smooth metal rod, of 3.2 mm diameter, was placed over two adjacent 5 liter capacity polypropylene tanks. One of the propylene tanks was filled with POWERCRON® 935 cationic acrylic electrocoat paint (available from PPG Industries, Inc., Pittsburgh, Pa., USA) while the other propylene tank was filled with tap water of conductivity 450 μS. One end of the rod was placed over the polypropylene tank that was filled with POWERCRON® 935 while the opposite end of the rod was placed over to the polypropylene tank that was filled with the tap water. A pump was attached to each tank which pulls liquid from the bottom and delivers it through a metal 5 mm diameter pipe nipple that was suspended less than 25 mm above the surface of the rod. The outlet of the pipe nipples were pointed downward such that the flow from the nipple is applied onto the metal rod below it. The pipe nipple that delivered the electrocoat was electrically connected to the positive terminal of a 500 V rectifier through use of a metal clip and wire. The pipe nipple that delivered the tap water was connected to the negative terminal of the same 500 V rectifier. Each pump was turned on to deliver a flow of electrocoat paint and tap water over two separate sections of the rod, while controlling the flow rate of each stream such that they were separated from one another on the surface of the rod. After turning the DC rectifier on, which created a 350V potential between the positive and negative terminals for 30 seconds, a 20-30 micron film of electrocoat was deposited onto the rod section that was in contact with the electrocoat paint stream. The rectifier was then turned off and the coating process stopped. The metal rod was then flipped such that the tap water flowed over the end of the rod that was electrocoated while the uncoated section of the metal rod (i.e., the end of the rod that was previously under the tap water stream) was the placed under the electrocoat paint stream. The rectifier was then turned on a second time for 30 seconds, creating a 350V potential between the terminals, and a 20-30 micron thick layer of electrocoat paint was deposited onto that end of the metal rod, resulting in coverage where the electrcoat paint was in contact with the metal rod.

Example 2

This example was conducted in a manner similar to that of Example 1 except that the smooth metal rod was replaced with a 10 mm diameter threaded metal rod.

Example 3

This example was conducted in a manner similar to that of Example 2 except that the electrocoat paint that was used was POWERCRON 920H (available from PPG Industries, Inc., Pittsburgh, Pa., USA).

Example 4

This example was conducted in a manner similar to that of Example 3 except that the threaded metal rod was placed on a series of plastic rollers, driven by a variable speed motor, that moved the rod over the polypropylene tanks at a speed of 25-40 cm/minute. Moreover, in this example, the volume of the tanks were increased to a 20 liter capacity and each of the metal pipe nipples were replaced with a 25 mm (W)×225 mm (L) metal flow box. Each flow box had a series of 1.5 mm holes drilled in a straight line along the length of the box. The flow boxes were placed within 25 mm of the threaded metal rod. The amount of liquid that exited each flow box provided 20 cm of liquid curtain. As the threaded rod moved through the curtain, the total contact time between the curtain and the threaded rod was 30 seconds when the rod was travelling at 40 cm/minute. When the rectifier was energized, the electrocoat paint was deposited onto the portion of the rod that was in contact with the electrocoat paint stream while another section of the rod was simultaneously in contact with tap water stream.

Example 5

This example was conducted in a manner similar to that of Example 4, except that an additional polypropylene tank (including a metal flow delivery system), which contained tap water, was placed in-line. This arrangement has a central polypropylene tank containing the electrocoat paint between the two tanks containing tap water. A flow box was placed above this additional tap water tank and was connected to the negative terminal of the rectifier, in parallel with the original tap water flow box. As the cylindrical metal rod of length 60 cm traveled through the various curtains of tap water and/or electrocoat paint, the rod was long enough that coating was continuous: any time electrocoat paint flowed over the rod, there was a section that was simultaneously under one of the curtains of tap water. After traveling through the process, the metal rod has a 10-25 micron thick layer of deposited electrocoat paint over its entire surface.

Example 6

This example was conducted in a manner similar to that of Example 5 except that ultrafilter permeate was used instead of tap water.

Example 7

This example was performed in a manner similar to that of Example 6 except that the metal rod was replaced with a flat metal panel that was 20 cm (W)×45 cm (L). In this example, the nozzles were suspended 20 mm above the panel. Between the liquid curtains, an air knife apparatus forced a jet of compressed air onto the work piece. The compressed air jet kept the flows from the various curtains separated from one another. The process of one central electrocoat curtain surrounded by two grounded curtains of conductive liquid, allowed continuous Electrodeposition to occur. An applied potential of 400V and maximum current of 500 mA resulted in a coating of 20-30 microns in thickness.

Example 8

This example was conducted in a manner similar to that of Example 7 except that the flat metal panel was replaced with a flat, mirrored glass surface. The back surface was either electrically conductive or had had an electrically conductive coating applied to that surface, such that coating could be performed.

Example 9

This example was conducted in a manner similar to that of Example 8 except that the mirrored glass was curved in a manner that would allow incident light to be collected. In this example, the flow boxes were modified so that their shape conformed to the curvature of the back surface of the mirror, following its curvature at a 5-15 mm distance.

What is claimed is:
1. A method for coating a substrate wherein the substrate is electrically conductive, the method comprising simultaneously applying a plurality of electrically conductive liquid materials to different portions of the substrate wherein at least one of the electrically conductive liquid materials comprises an ionic compound; and applying an electrical current to at least one of the liquid materials thereby depositing the ionic compound onto the substrate.

2. The method of claim 1, wherein the electrically conductive liquid that comprises the ionic compound comprises an electrodepositable coating composition.

3. The method of claim 2, wherein the ionic compound comprises an ionic film-forming polymer.

4. The method of claim 1, wherein the ionic compound comprises an electrical charge that is anionic or cathodic.

5. A substrate coated according to claim 1, wherein the substrate is substantially free of mechanical contact points used to pass electrical current through the conductive substrate.

6. A method for coating a substrate wherein the substrate is electrically conductive, the method comprising:
   applying an electrodepositable coating composition comprising an ionic compound onto at least a portion of the substrate; and
   simultaneously applying another liquid material onto another portion of the substrate;
   wherein both the electrodepositable coating composition and the liquid material are electrically conductive; and
   wherein when an electrical current is applied to the electrodepositable coating composition or the electrically conductive liquid material, the electrical potential gradient between the electrodepositable coating composition and the electrically conductive liquid material is sufficient to allow the ionic compound to deposit onto the substrate.

7. The method according to claim 6, wherein the liquid material comprises an ion, a polymeric resin, or combinations thereof.

8. The method according to claim 6, wherein the liquid material comprises permeate.

9. The method according to claim 6, wherein the liquid material comprises water.

10. The method according to claim 6, wherein the electrodepositable coating composition comprises a cationic or anionic charge.

11. The method according to claim 10, wherein the ionic compound comprises an ionic film-forming polymer.

12. The method according to claim 10, wherein the liquid material comprises a cationic or anionic charge.

13. The method according to claim 12, wherein the electrodepositable coating composition comprises a cationic charge and the liquid material comprise an anionic charge.

14. The method according to claim 12, wherein the electrodepositable coating composition comprises an anionic charge and the liquid material comprises a cationic charge.

15. The method according to claim 6, wherein after the electrodepositable coating composition is deposited onto the substrate, the electrodepositable coating composition is substantially cured.

16. The method according to claim 6, wherein the substrate comprises a metallic object.

17. The method according to claim 6, wherein the substrate comprises glass with at least one conductive surface.

18. The method according to claim 16, wherein the metallic object comprise sheet metal, rod, pipe, screen or combinations thereof.

19. The method according to claim 6, wherein the substrate comprise a substantially non-electrically conductive interior portion and a substantially-electrically conductive exterior portion that is disposed over at least a portion of the non-electrically conductive interior portion; and wherein the electrodepositable coating composition is deposited on at least a portion of the exterior portion of the substrate.

20. The method according to claim 6, wherein the electrodepositable coating composition and the liquid material are applied onto the substrate using a curtain process.

* * * * *